(12) United States Patent
Aymeloglu et al.

(10) Patent No.: US 9,348,499 B2
(45) Date of Patent: May 24, 2016

(54) SHARING OBJECTS THAT RELY ON LOCAL RESOURCES WITH OUTSIDE SERVERS

(75) Inventors: Andrew Aymeloglu, Palo Alto, CA (US); Nicholas Miyake, Palo Alto, CA (US); Brandon Burr, Palo Alto, CA (US); Derek Cicerone, Palo Alto, CA (US); Kevin Simler, Palo Alto, CA (US); Garry Tan, San Francisco, CA (US)

(73) Assignee: Palantir Technologies, Inc., Palo Alto, CA (US)

(*) Notice: Subject to any disclaimer, the term of this patent is extended or adjusted under 35 U.S.C. 154(b) by 49 days.

(21) Appl. No.: 12/556,307

(22) Filed: Sep. 9, 2009

(65) Prior Publication Data

US 2010/0070531 A1    Mar. 18, 2010

Related U.S. Application Data

(60) Provisional application No. 61/122,695, filed on Dec. 15, 2008, provisional application No. 61/097,059, filed on Sep. 15, 2008.

(51) Int. Cl.

| | | |
|---|---|---|
| G06F 17/30 | (2006.01) | |
| G06F 3/0486 | (2013.01) | |
| G06F 17/22 | (2006.01) | |
| G06F 17/27 | (2006.01) | |

(52) U.S. Cl.
CPC .......... *G06F 3/0486* (2013.01); *G06F 17/2288* (2013.01); *G06F 17/2765* (2013.01)

(58) Field of Classification Search
None
See application file for complete search history.

(56) References Cited

U.S. PATENT DOCUMENTS

| | | | |
|---|---|---|---|
| 5,826,021 | A | 10/1998 | Mastors et al. |
| 5,832,218 | A | 11/1998 | Gibbs et al. |
| 5,878,434 | A | 3/1999 | Draper et al. |
| 5,897,636 | A | 4/1999 | Kaeser |
| 5,966,706 | A | 10/1999 | Biliris et al. |

(Continued)

FOREIGN PATENT DOCUMENTS

| | | |
|---|---|---|
| CN | 102054015 | 5/2014 |
| DE | 102014204827 | 9/2014 |

(Continued)

OTHER PUBLICATIONS

Claims, PCT/US08/79072, 11 pages.

(Continued)

*Primary Examiner* — Miranda Huang
(74) *Attorney, Agent, or Firm* — Hickman Palermo Becker Bingham LLP

(57) ABSTRACT

To prevent potential confusion when referencing an object by name, a party may supplementary or alternatively include referential metadata, other than the name by which the object is known to the party, that describes the referenced object. A party receiving information that includes such referential metadata for an object may utilize the referential metadata to identify a local object that matches or may substitute for the object referenced by the sending party. For example, a broker operating a financial system may generate a chart based on a first named object. The broker may wish to send the chart to another broker operating a different financial system. Since the first name object may be known by a different name in the different financial system, the financial system may replace the name of the object with referential metadata prior to sending the chart.

52 Claims, 4 Drawing Sheets

(56) References Cited

U.S. PATENT DOCUMENTS

| | | | |
|---|---|---|---|
| 6,006,242 A | 12/1999 | Poole et al. | |
| 6,057,757 A | 5/2000 | Arrowsmith et al. | |
| 6,134,582 A | 10/2000 | Kennedy | |
| 6,243,717 B1 | 6/2001 | Gordon et al. | |
| 6,430,305 B1 | 8/2002 | Decker | |
| 6,463,404 B1 | 10/2002 | Appleby | |
| 6,519,627 B1 | 2/2003 | Dan et al. | |
| 6,523,019 B1 | 2/2003 | Borthwick | |
| 6,745,382 B1 | 6/2004 | Zothner | |
| 7,058,648 B1 | 6/2006 | Lightfoot et al. | |
| 7,089,541 B2 | 8/2006 | Ungar | |
| 7,155,728 B1 | 12/2006 | Prabhu et al. | |
| 7,403,942 B1 | 7/2008 | Bayliss | |
| 7,461,158 B2 | 12/2008 | Rider et al. | |
| 7,627,489 B2 | 12/2009 | Schaeffer et al. | |
| 7,739,246 B2 | 6/2010 | Mooney et al. | |
| 7,757,220 B2 | 7/2010 | Griffith et al. | |
| 7,912,842 B1* | 3/2011 | Bayliss | 707/749 |
| 7,962,495 B2 | 6/2011 | Jain et al. | |
| 8,117,022 B2 | 2/2012 | Linker | |
| 8,126,848 B2 | 2/2012 | Wagner | |
| 8,290,838 B1 | 10/2012 | Thakur et al. | |
| 8,302,855 B2 | 11/2012 | Ma et al. | |
| 8,364,642 B1 | 1/2013 | Garrod | |
| 8,386,377 B1 | 2/2013 | Xiong et al. | |
| 8,417,715 B1 | 4/2013 | Bruckhaus et al. | |
| 8,429,527 B1 | 4/2013 | Arbogast | |
| 8,554,719 B2 | 10/2013 | McGrew | |
| 8,601,326 B1 | 12/2013 | Kirn | |
| 8,639,552 B1 | 1/2014 | Chen et al. | |
| 8,688,573 B1 | 4/2014 | Rukonic et al. | |
| 8,812,444 B2 | 8/2014 | Garrod et al. | |
| 8,838,538 B1 | 9/2014 | Landau et al. | |
| 8,855,999 B1 | 10/2014 | Elliot | |
| 8,903,717 B2 | 12/2014 | Elliot | |
| 8,924,388 B2 | 12/2014 | Elliot et al. | |
| 8,924,389 B2 | 12/2014 | Elliot et al. | |
| 8,938,434 B2 | 1/2015 | Jain et al. | |
| 8,938,686 B1 | 1/2015 | Erenrich et al. | |
| 9,105,000 B1 | 8/2015 | White et al. | |
| 9,230,060 B2 | 1/2016 | Friedlander et al. | |
| 2002/0035590 A1 | 3/2002 | Eibach et al. | |
| 2002/0095360 A1 | 7/2002 | Joao | |
| 2002/0103705 A1 | 8/2002 | Brady | |
| 2002/0194058 A1 | 12/2002 | Eldering | |
| 2003/0088438 A1 | 5/2003 | Maughan et al. | |
| 2003/0093401 A1 | 5/2003 | Czajkowski et al. | |
| 2003/0105759 A1 | 6/2003 | Bess et al. | |
| 2003/0115481 A1 | 6/2003 | Baird et al. | |
| 2003/0126102 A1 | 7/2003 | Borthwick | |
| 2003/0171942 A1 | 9/2003 | Gaito | |
| 2003/0177112 A1 | 9/2003 | Gardner | |
| 2003/0182313 A1 | 9/2003 | Federwisch et al. | |
| 2003/0212718 A1 | 11/2003 | Tester | |
| 2004/0003009 A1 | 1/2004 | Wilmot | |
| 2004/0006523 A1* | 1/2004 | Coker | 705/35 |
| 2004/0034570 A1 | 2/2004 | Davis | |
| 2004/0083466 A1 | 4/2004 | Dapp et al. | |
| 2004/0088177 A1 | 5/2004 | Travis et al. | |
| 2004/0117387 A1 | 6/2004 | Civetta et al. | |
| 2004/0153451 A1 | 8/2004 | Phillips et al. | |
| 2004/0193608 A1 | 9/2004 | Gollapudi et al. | |
| 2004/0210763 A1 | 10/2004 | Jonas | |
| 2004/0236688 A1 | 11/2004 | Bozeman | |
| 2005/0010472 A1 | 1/2005 | Quatse et al. | |
| 2005/0097441 A1 | 5/2005 | Herbach et al. | |
| 2005/0102328 A1 | 5/2005 | Ring et al. | |
| 2005/0131935 A1 | 6/2005 | O'Leary et al. | |
| 2005/0262512 A1 | 11/2005 | Schmidt et al. | |
| 2006/0010130 A1 | 1/2006 | Leff et al. | |
| 2006/0080283 A1 | 4/2006 | Shipman | |
| 2006/0080316 A1 | 4/2006 | Gilmore et al. | |
| 2006/0143075 A1 | 6/2006 | Carr et al. | |
| 2006/0178954 A1 | 8/2006 | Thukral et al. | |
| 2006/0218206 A1 | 9/2006 | Bourbonnais et al. | |
| 2006/0218491 A1 | 9/2006 | Grossman et al. | |
| 2006/0253502 A1 | 11/2006 | Raman et al. | |
| 2007/0000999 A1 | 1/2007 | Kubo et al. | |
| 2007/0067285 A1 | 3/2007 | Blume | |
| 2007/0162454 A1 | 7/2007 | D'Albora et al. | |
| 2007/0178501 A1 | 8/2007 | Rabinowitz et al. | |
| 2007/0192122 A1 | 8/2007 | Routson et al. | |
| 2007/0233756 A1 | 10/2007 | D'Souza et al. | |
| 2007/0271317 A1 | 11/2007 | Carmel | |
| 2007/0284433 A1 | 12/2007 | Domenica et al. | |
| 2007/0295797 A1 | 12/2007 | Herman et al. | |
| 2007/0299697 A1* | 12/2007 | Friedlander et al. | 705/3 |
| 2008/0005063 A1 | 1/2008 | Seeds | |
| 2008/0126344 A1 | 5/2008 | Hoffman et al. | |
| 2008/0126951 A1 | 5/2008 | Sood et al. | |
| 2008/0140387 A1 | 6/2008 | Linker | |
| 2008/0195672 A1 | 8/2008 | Hamel et al. | |
| 2008/0208735 A1 | 8/2008 | Balet et al. | |
| 2008/0228467 A1 | 9/2008 | Womack et al. | |
| 2008/0267386 A1 | 10/2008 | Cooper | |
| 2008/0270316 A1 | 10/2008 | Guidotti et al. | |
| 2008/0281580 A1 | 11/2008 | Zabokritski | |
| 2008/0313132 A1 | 12/2008 | Hao et al. | |
| 2009/0055487 A1 | 2/2009 | Moraes et al. | |
| 2009/0094270 A1 | 4/2009 | Alirez et al. | |
| 2009/0106178 A1 | 4/2009 | Chu | |
| 2009/0106242 A1* | 4/2009 | McGrew et al. | 707/6 |
| 2009/0112745 A1 | 4/2009 | Stefanescu | |
| 2009/0157732 A1 | 6/2009 | Hao et al. | |
| 2009/0164387 A1 | 6/2009 | Armstrong et al. | |
| 2009/0187546 A1 | 7/2009 | Whyte et al. | |
| 2009/0249244 A1 | 10/2009 | Robinson et al. | |
| 2009/0271343 A1 | 10/2009 | Vaiciulis et al. | |
| 2009/0299830 A1 | 12/2009 | West et al. | |
| 2009/0307049 A1 | 12/2009 | Elliott et al. | |
| 2009/0313311 A1 | 12/2009 | Hoffmann et al. | |
| 2009/0313463 A1 | 12/2009 | Pang et al. | |
| 2010/0057622 A1 | 3/2010 | Faith et al. | |
| 2010/0070842 A1 | 3/2010 | Aymeloglu et al. | |
| 2010/0703531 | 3/2010 | Aymeloglu et al. | |
| 2010/0082541 A1 | 4/2010 | Kottomtharayil | |
| 2010/0082671 A1 | 4/2010 | Li et al. | |
| 2010/0098318 A1 | 4/2010 | Anderson | |
| 2010/0114817 A1 | 5/2010 | Gilbert et al. | |
| 2010/0145909 A1 | 6/2010 | Ngo | |
| 2010/0204983 A1 | 8/2010 | Chung et al. | |
| 2010/0306285 A1 | 12/2010 | Shah et al. | |
| 2011/0066497 A1 | 3/2011 | Gopinath et al. | |
| 2011/0093327 A1 | 4/2011 | Fordyce et al. | |
| 2011/0099133 A1 | 4/2011 | Chang et al. | |
| 2011/0145401 A1 | 6/2011 | Westlake | |
| 2011/0173093 A1 | 7/2011 | Psota et al. | |
| 2011/0208565 A1 | 8/2011 | Ross et al. | |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2012/0013684 A1 | 1/2012 | Lucia | |
| 2012/0022945 A1 | 1/2012 | Falkenborg et al. | |
| 2012/0059853 A1 | 3/2012 | Jagota | |
| 2012/0078595 A1 | 3/2012 | Balandin et al. | |
| 2012/0084287 A1 | 4/2012 | Lakshminarayan et al. | |
| 2012/0191446 A1 | 7/2012 | Binsztok et al. | |
| 2012/0215784 A1 | 8/2012 | King et al. | |
| 2013/0006947 A1 | 1/2013 | Akinyemi et al. | |
| 2013/0096968 A1 | 4/2013 | Van Pelt et al. | |
| 2013/0097130 A1 | 4/2013 | Bingol et al. | |
| 2013/0124193 A1 | 5/2013 | Holmberg | |
| 2013/0132348 A1 | 5/2013 | Garrod | |
| 2013/0151453 A1 | 6/2013 | Bhanot et al. | |
| 2013/0166480 A1 | 6/2013 | Popescu et al. | |
| 2013/0226879 A1 | 8/2013 | Talukder et al. | |
| 2013/0226944 A1 | 8/2013 | Baid et al. | |
| 2013/0246316 A1 | 9/2013 | Zhao et al. | |
| 2013/0263019 A1 | 10/2013 | Castellanos et al. | |
| 2014/0006404 A1 | 1/2014 | McGrew et al. | |
| 2014/0108074 A1 | 4/2014 | Miller et al. | |
| 2014/0222793 A1 | 8/2014 | Sadkin et al. | |
| 2014/0358829 A1 | 12/2014 | Hurwitz | |

(56) References Cited

U.S. PATENT DOCUMENTS

| | | | |
|---|---|---|---|
| 2015/0012509 A1 | 1/2015 | Kirn | |
| 2015/0046481 A1 | 2/2015 | Elliot | |
| 2015/0106379 A1 | 4/2015 | Elliot et al. | |

FOREIGN PATENT DOCUMENTS

| | | |
|---|---|---|
| DE | 102014204830 | 9/2014 |
| DE | 102014204834 | 9/2014 |
| DE | 102014213036 | 1/2015 |
| EP | 2487610 | 8/2012 |
| EP | 2778913 | 9/2014 |
| EP | 2778914 | 9/2014 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2009/051987 | 4/2009 |
| WO | WO 2010/030919 | 3/2010 |

OTHER PUBLICATIONS

L.W. Young, USPTO, International Search Report & Written Opinion, mailed by U.S. Patent and Trademark Office and published by USPTO, United States and/or International Bureau of WIPO, Geneva, Switzerland, Dec. 5, 2008, 8 pages.

Lim, Ee-Peng, et al., Resolving Attribute Incompatibility in Database Integration: An Evidential Reasoning Approach [online]. Published by Department of Computer Science, University of Minnesota, pp. 1-10. [Retrieved on Sep. 24, 2008], retrieved from the Internet: URL:http://reference.kfupm.edu.sa/content/r/e/resolving_attribute_incompatibility_in_d_531691.pdf.

A Real-World Problem of Matching Records. Entity Resolution. Published by the Universitat Pompeu Fabra [online]. Nov. 2006 [retrieved on Sep. 24, 2008], pp. 1-16. Retrieved from the Internet: URL:http://grupoweb.upf.es/bd-web/slides/ullman.pdf. Center for research, Chile, South America.

Litwin, Witold, Multidatabase Interoperability, 1986 IEEE, pp. 10-18, retrieved from the Internet: http://ceria.dauphine.fr/mdb-interoperability.pdf.

Qiang, Bao-Hua, A Mutual-Information-Based Approach to Entity Reconciliation in Heterogeneous Databases, 2008 IEEE Computer Society, pp. 666-669. Retrieved from the Internet: ftp://ftp.computer.org/press/outgoing/proceedings/csse08/data/3336a666.pdf.

Zhao, Huimin, Entity matching across heterogeneous data sources: An approach based on constrained cascade generalization, Data & Knowledge Engineering, May 4, 2008, pp. 368-381. Retrieved from the Internet: http://hem.hj.se/~life/db/Entity%20matching%20across%20heterogeneous%20data%20sources%20-%20An%20approach%20based%20on%20constrained%20cascade%20generalization.pdf.

European Patent Office, "Search Report" in application No. 13157474.1-1958, dated May 28, 2013, 6 pages.

Current Claims in application No. 13157474.1-1958, dated Mar. 2013, 2 pages.

Wollrath et al., USENIX, "A Distributed Object Model for the Java System" dated Jun. 1996, 4 pages.

"A Real-World Problem of Matching Records," Nov. 2006, <http://grupoweb.upf.es/bd-web/slides/ullman.pdf> pp. 1-16.

"A Tour of Pinboard," <http://pinboard.in/tour> as printed May 15, 2014 in 6 pages.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Delicious, <http://delicious.com/> as printed May 15, 2014 in 1 page.

"E-MailRelay," <http://web.archive.org/web/20080821175021/http://emailrelay.sourceforge.net/> Aug. 21, 2008, pp. 2.

Gu et al., "Record Linkage: Current Practice and Future Directions," Jan. 15, 2004, pp. 32.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Nadeau et al., "A Survey of Named Entity Recognition and Classification," Jan. 15, 2004, pp. 20.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Sekine et al., "Definition, Dictionaries and Tagger for Extended Named Entity Hierarchy," May 2004, pp. 1977-1980.

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

Official Communication for New Zealand Patent Application No. 622389 dated Mar. 20, 2014.

Official Communication for New Zealand Patent Application No. 622404 dated Mar. 20, 2014.

Extended European Search Report for European Patent Application No. 14158958.0 dated Jun. 3, 2014.

Extended European Search Report for European Patent Application No. 14158977.0 dated Jun. 10, 2014.

European Search Report for European Patent Application No. 09813700.3 dated Apr. 3, 2014.

Official Communication for New Zealand Patent Application No. 622439 dated Mar. 24, 2014.

Official Communication for New Zealand Patent Application No. 622473 dated Mar. 27, 2014.

Official Communication for New Zealand Patent Application No. 622473 dated Jun. 19, 2014.

Official Communication for New Zealand Patent Application No. 628161 dated Aug. 25, 2014.

Official Communication for Great Britain Patent Application No. 1404499.4 dated Aug. 20, 2014.

Official Communication for Great Britain Patent Application No. 1404486.1 dated Aug. 27, 2014.

Official Communication for Great Britain Patent Application No. 1404489.5 dated Aug. 27, 2014.

Official Communication for Great Britain Patent Application No. 1411984.6 dated Dec. 22, 2014.

Official Communication for Canadian Patent Application No. 2807899 dated Oct. 24, 2014.

European Patent Office, "Search Report" in application No. 09813700.3-1507, dated Apr. 3, 2014, 9 pages.

E-MailRelay, Wayback Machine, dated Aug. 21, 2008, 2 pages.

Current Claims in European application No. 098137000.3-1507, dated Apr. 2014.

Brandel, Mary Brandel, "Dos and Don't's for Data Loss Prevention", wayback machine, dated Jul. 24, 2008, 6 pages.

PCT/US2009/056709 International Search Report & Written Opinion, dated Apr. 15, 2010, 11 pages.

Current Claims, PCT/US2009/056709, 7 pages.

Nin et al., "On the Use of Semantic Blocking Techniques for Data Cleansing and Integration," 11th International Database Engineering and Applications Symposium, Sep. 6-8, 2007, pp. 9.

Lim et al., "Resolving Attribute Incompatibility in Database Integration: An Evidential Reasoning Approach," Department of Computer Science, University of Minnesota, dated Feb. 14, 1994, <http://reference.kfupm.edu.sa/content/r/e/resolving_attribute_incompatibility_in_d_531691.pdf> pp. 1-10.

Hua et al., "A Multi-attribute Data Structure with Parallel Bloom Filters for Network Services" HiPC 2006, LNCS 4297, pp. 277-288, dated Dec. 18, 2006.

Johnson, Maggie "Introduction to YACC and Bison", dated Jul. 8, 2005, 11 pages.

Johnson, Steve, "Access 2013 on demand," Access 2013 on Demand, May 9, 2013, Que Publishing.

Pythagoras Communications Ltd., "Microsoft CRM Duplicate Detection," Sep. 13, 2011, https://www.youtube.com/watch?v=j-7Qis0D0Kc.

Wang et al., "Research on a Clustering Data De-Duplication Mechanism Based on Bloom Filter," IEEE 2010, 5 pages.

(56) References Cited

OTHER PUBLICATIONS

Official Communication for Australian Patent Application No. 2014201506 dated Feb. 27, 2015.
Official Communication for Australian Patent Application No. 2014201507 dated Feb. 27, 2015.
Official Communication for European Patent Application No. 14158977.0 dated Apr. 16, 2015.
Official Communication for European Patent Application No. 14158958.0 dated Apr. 16, 2015.
Official Communication for Australian Patent Application No. 2014203669 dated May 29, 2015.
Official Communication for Great Britain Patent Application No. 1404486.1 dated May 21, 2015.
Official Communication for Great Britain Patent Application No. 1404489.5 dated May 21, 2015.
Official Communication for Netherlands Patent Application No. 2013134 dated Apr. 20, 2015.
Official Communication for Great Britain Patent Application No. 1404499.4 dated Jun. 11, 2015.
Official Communication for Canadian Patent Application No. 2807899 dated Jul. 20, 2015.
Claims for Canadian Patent Application No. 2807899 dated Jul. 2015, 2 pages.
European Patent Office, "Search Report", in application No. 08839003.4-1225, dated Aug. 14, 2012, 9 pages.
Current Claims in application No. 08839003.4-1225, dated Aug. 2012, 5 pages.
Sekine et al., Definition, Dictionaries and Tagger for Extended Name Entity Hierarchy dated May 2004, 4 pages.
Gu et al., "Record Linkage: Current Practice and Future Directions", dated Jan. 15, 2004, 32 pages.
Nadeau et al., "A Survey of Names Entity Recognition and Classification" dated Jan. 15, 2004, 20 pages.
U.S. Appl. No. 14/552,336, filed Nov. 24, 2014, Notice of Allowance, mailed Nov. 3, 2015.
U.S. Appl. No. 13/411,291, filed Mar. 2, 2012, Interview Summary, mailed Oct. 1, 2015.
U.S. Appl. No. 14/571,098, filed Dec. 15, 2014, First Action Interview, mailed Aug. 24, 2015.
U.S. Appl. No. 13/827,491, filed Mar. 14, 2013, Office Action, mailed Oct. 9, 2015.
U.S. Appl. No. 14/571,098, filed Dec. 15, 2014, First Action Interview, mailed Nov. 10, 2015.
U.S. Appl. No. 14/800,447, filed Jul. 15, 2015, First Action Interview, mailed Dec. 10, 2015.
Chaudhuri et al., "An Overview of Business Intelligence Technology," Communications of the ACM, Aug. 2011, vol. 54, No. 8.
Wikipedia, "Multimap," Jan. 1, 2013, https://en.wikipedia.org/w/index.php?title=Multimap&oldid=530800748.
Official Communication for New Zealand Patent Application No. 622439 dated Jun. 6, 2014.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application No. 2012438 dated Sep. 21, 2015.
Official Communication for European Patent Application No. 13157474.1 dated Oct. 30, 2015.
Claims for European Patent Application No. 13157474.1 dated Oct. 2015.
Winkler, William, "Matching and Record Linkage" Wiley Interdisciplinary Reviews: Computational Statistics, vol. 6, No. 5, Dated Sep. 1, 2014, 38 pages.
European Patent Office, "Summons to Attend Oral Proceedings Pursuant to Rule 115", in application No. 08839003.4-1951 dated Nov. 27, 2015, 6 pages.
European Claims in application No. 13 157 474.1-1958, dated Oct. 2015, 2 pages.
Notice of Acceptance for Australian Patent Application No. 2014203669 dated Jan. 21, 2016.

\* cited by examiner

SHARING OBJECTS THAT RELY ON LOCAL RESOURCES WITH OUTSIDE SERVERS

PRIORITY CLAIM

This application claims the benefit of Provisional Application 61/097,059, entitled "Collaborative Interface Enhancements" and filed Sep. 15, 2008, the entire contents of which is hereby incorporated by reference as if fully set forth herein, under 35 U.S.C. §119(e). This application further claims the benefit of Provisional Application 61/122,695, entitled "WorkFlows, Screenshot Techniques, and Sharing Information across Servers" and filed Dec. 15, 2008, the entire contents of which is hereby incorporated by reference as if fully set forth herein, under 35 U.S.C. §119(e).

FIELD OF THE INVENTION

Embodiments of the invention described herein relate generally to information sharing, and, more specifically, to techniques for sharing information that relies upon local references across servers for which those references may have different meanings.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Collaboration between multiple parties often requires that the parties share various items of information, such as documents, tables, spreadsheets, graphs, and charts. When sharing these items of information, the parties and/or the information sharing mechanisms relied upon by those parties often reference certain objects by name. For example, the parties may need to exchange a document that analyzes the performance of a certain financial instrument. The document may refer to the financial instrument by a name, such as "ALPHAlpha."

In some situations, a referenced name may not have the same meaning to all parties involved in the communication. For example, a first party may know a particular financial instrument by the name "ALPHAlpha," while a second party may know the particular financial instrument by the name "109328." When the first party attempts to communicate information that involves a financial instrument named "ALPHAlpha" to the second party, because the second party knows that financial instrument by the name "109328," the second party will be unable to determine the financial instrument to which the first party is referring.

In fact, in some cases the second party may associate the name "ALPHAlpha" with a different object than the particular financial instrument. Since the second party will believe that the first party is communicating information that involves a different object than was intended, the second party may entirely misunderstand the information communicated by the first party. Moreover, since the first party cannot be certain that the first party's version of "ALPHAlpha" is associated with the same data as the second party's version of "ALPHAlpha," the first party may hesitate to share any information at all, lest the second party be misled as to the meaning of the information.

In some cases, the second party in the above information exchange scenario may lack access to data for a financial instrument that exactly corresponds to the particular financial instrument, but may still have access to an object labeled "ALPH" whose data is close enough to the exchanged information so as to render the object an effective substitute for the particular financial instrument. If the second party were capable of recognizing that an object to which it has access could serve as a substitute for the financial instrument, the second party would be able to understand the information that the first party wishes to share. However, again because of the differences in nomenclature, the second party will be unable to identify the object as a substitute for the financial instrument referenced by the first party.

The inability of a party to correctly identify an object or a substitute for an object referenced by another party can severely cripple an exchange of information. For example, in many cases, parties share items of information that include metadata in place of actual data. This metadata may include the name of one or more objects associated with the actual data, and by which the actual data may be located. The actual data utilized in a document is therefore retrieved dynamically based on the metadata.

Sharing metadata instead of actual data is particularly common when each party may rely upon a separate data source. For example, sharing metadata instead of actual data may be desirable for security or efficiency purposes, in that the parties may be unwilling or unable to transmit actual data. Or, sharing metadata instead of actual data may be useful for the purposes of ensuring that a shared document or graph is always populated with the most recent data available to a party.

However, because each party is relying on a separate data source, there is no way to guarantee that the parties name various objects in a consistent fashion. Nor is there any guarantee that the parties have access to the same type of data. For example, one party may subscribe to data from Bloomberg, while another party may subscribe to data from Reuters. These potential differences between data sources complicate any exchange of documents that rely upon metadata instead of actual data. For example, if a second party is unable to rely upon metadata in a document shared by a first party to correctly identify an object in the second party's data repository that corresponds to an object that the first party intended to reference, the second party will be unable to understand the information conveyed in that document.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
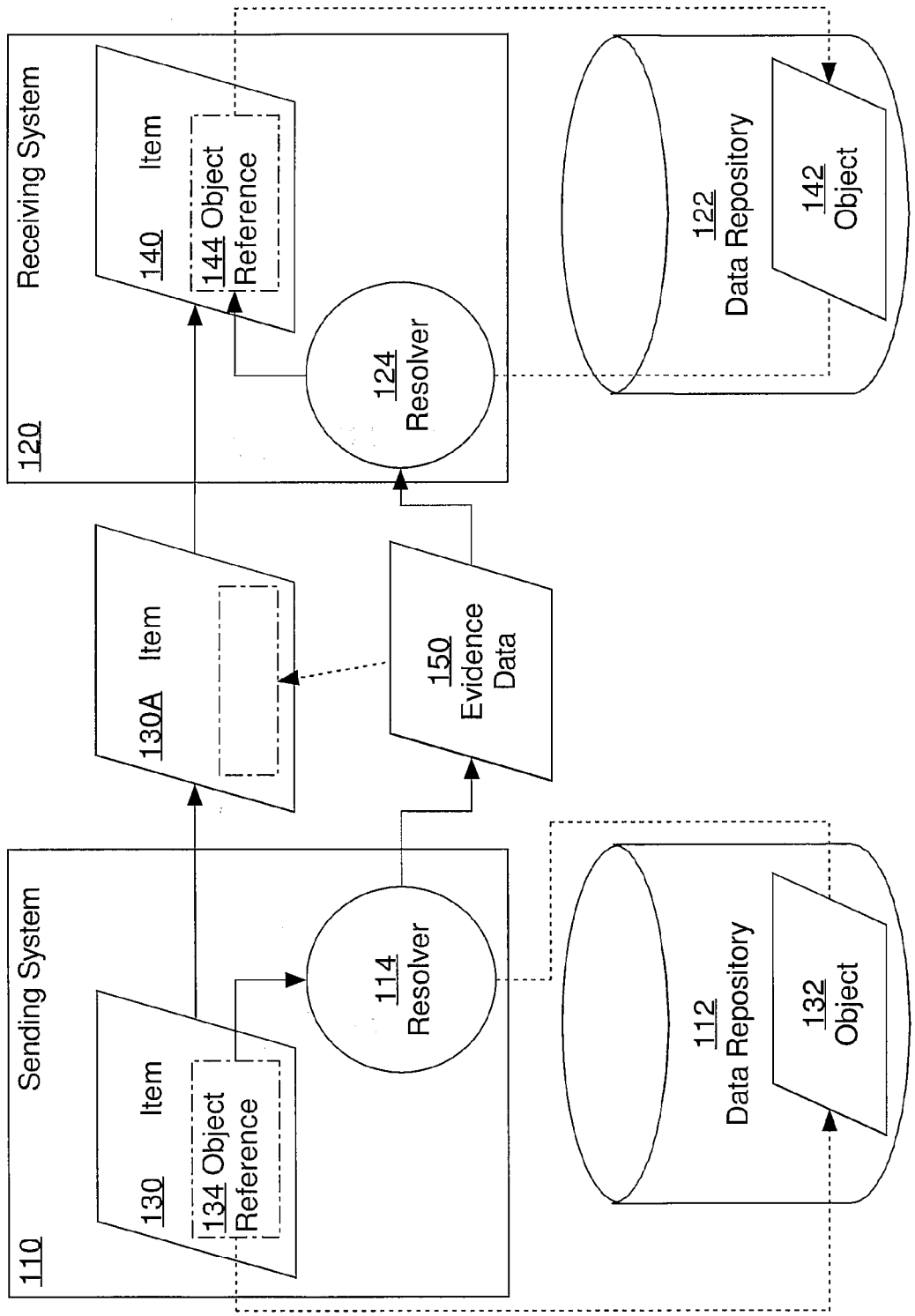
FIG. 1 illustrates an architecture 100 for sharing information between a sending system and a receiving system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Example Architecture for Sharing Information
3.0. Functional Description
4.0. Implementation Examples
   4.1. Evidence Data
   4.2. Generating Evidence Data
   4.3. Matching
   4.4. Miscellaneous
5.0. Implementation Mechanism—Hardware Overview
6.0. Extensions and Alternatives 1.0. General Overview In an embodiment, to prevent potential confusion when referencing an object by name, a party may utilize referential metadata, other than the name by which the object is known to the party, to describe the referenced object. This referential metadata is hereinafter referred to as "evidence." A party receiving information that includes evidence for an object may utilize that evidence to identify a local object that matches or may substitute for an object referenced by the sending party.

According to an embodiment, a first user at a first system sends an item of information to a second user at a second system. The item of information relies upon data associated with a first object stored at a first data source accessible to the first system. The item of information therefore comprises metadata indicating a name by which the first system references the first object. Prior to sending the item to the second system, the first system generates evidence of the first object. The first system includes the evidence with the item of information when sending the item to the second system. In this manner, the first system provides the second system data by which the second system may identify or verify objects that the second system may substitute for the first object.

According to an embodiment, a second user at a second system receives an item of information from a first user at a first system. The item of information relies upon data from a first object at the first system. The second system also receives evidence for the first object. The second system determines that a second object, stored at a second data source accessible to the second system, matches the evidence. The second system relies upon the second object in place of the first object. In this manner, the second system ensures that the item of information, as seen by the second user, is based upon data that sufficiently corresponds to the data that the first user intended the item of information to be based upon.

According to an embodiment, the evidence describes characteristics that are desirable in or essential to any object that is substituted for the referenced object. According to an embodiment, the evidence uniquely and unambiguously identifies an object. According to an embodiment, the evidence allows one to determine one or more objects that may potentially match the referenced object, along with a confidence level for each potentially matching object. According to an embodiment, the evidence may comprise one or more of the following: data indicating values for one or more attribute fields stored within or associated with the referenced object, wherein at least one value is a value other than the referenced object's name; metadata indicating the referenced object type; and metadata indicating the types and quantities of data stored within or associated with the referenced object.

2.0. Example Architecture for Sharing Information

FIG. 1 illustrates an architecture 100 for sharing information between a sending system 110 and a receiving system 120.

Sending system 110 and receiving system 120 are systems configured for interacting with data in data repositories 112 and 122, respectively. Systems 110 and 120 may comprise one or more computers operated by one or more users. Systems 110 and 120 may, for example, include a computer upon which executes one or more applications for accessing and analyzing the data in data repositories 112 and 122. Systems 110 and 120 may also include one or more servers for managing data in data repositories 112 and 122, as well as for managing various items of information, such as item 130. In an embodiment, systems 110 and 120 each include a financial analysis server, such as a Palantir Finance server, and a financial analysis client, such as a Palantir Finance client. However, systems 110 and 120 need not necessarily operate the same server and client software.

Data repositories 112 and 122 may be any components of systems 110 or 120 that are capable of storing data, including a database, database server, or file system. Data repositories 112 and 122 store a wide variety of objects, including objects 132 and 142, respectively. For example, Objects 132 and 142 may comprise any structured data, including, but not limited to, structured data related to financial instruments, tables, indexes, and entities. Objects 132 and 142 are said to be associated with the data of which objects 132 and 142 are comprised. Objects 132 and 142 may also be associated with data external to objects 132 and 142. For example, an object may contain one or more fields indicating values by which information associated with objects 132 and 142 are indexed in tables or other data structures of data repositories 112 and 122.

Objects 132 and 142 are identified in their respective systems by reference names 134 and 144, respectively. Reference names 134 and 144 are indicated by metadata associated with or stored in one or more fields of their respective objects. Reference names 134 and 144 uniquely identify their respective objects in their respective systems. In some embodiments, objects 132 and 142 are known within their system only by their respective reference names, while in other systems, objects 132 and 142 may instead be identified by other data fields as well. In some embodiments, objects 132 and 142 are of a common object type, and reference names 134 and 144 are both from a common field associated with or defined for that object type. Reference names 134 and 144 may also be referred to as labels or identifiers.

According to an embodiment, all objects within a system are uniquely identified by their name. According to an embodiment, all objects within a system are uniquely identified by their name and object type. According to an embodiment, all systems involved in the sharing of information utilize a common technique for identifying the name of an object. For example, all systems may expect that an object's name will be specified in a certain field of data stored in or associated with the object.

Sending system 110 shares items of information, such as item 130, with receiving system 120. Item 130 may be any of a wide variety of items that can be shared between multiple parties, including, but not limited to, documents, tables, spreadsheets, graphs, and charts. Item 130 relies, at least in part, on data associated with one or more objects, including object 132, from data repository 112. For example, item 130 may be a graph of data stored within object 132. Rather than storing the data from object 132 directly within item 130, system 110 references object 132 by reference name 134 from within item 130.

Prior to sharing item 130 with receiving system 120, system 110 detects that item 130 references object 132. In response, system 110 utilizes resolver component 114 to generate evidence data 150 for object 132. Evidence data 150 is data that describes characteristics of object 132, including characteristics other than reference name 134. Techniques for generating evidence data 150 are more fully described in subsequent sections.

Resolver 114 may be any software or hardware component of system 110 capable of producing evidence data 150 based on characteristics of object 132. System 110 may feature a single resolver 114 capable of generating evidence data 150 for any object in data repository 112. Alternatively, system 110 may feature a number of different resolvers 114, each adapted to producing evidence data 150 for a particular type of object in data repository 112.

System 110 then sends the evidence data 150 with a copy of item 130, i.e. item copy 130A, to receiving system 120. In some embodiments, system 110 embeds evidence data 150 directly within item copy 130A. In some embodiments, system 110 replaces reference name 134 with evidence data 150. In some embodiments, system 120 stores evidence data 150 separately from item copy 130A. System 120 may then send evidence data 150 to system 120 at the same time as item copy 130A, or at another time via mapping data that identifies evidence data 150 as being associated with reference name 134.

Upon receiving item copy 130A and evidence data 150, receiving system 120 determines that item copy 130A relies upon data associated with a referenced object. Using evidence data 150, system 120 attempts to determine an object in its data repository 122 that matches, or can substitute for, the referenced object. System 120 accomplishes this task by feeding evidence data 150 to a resolver component 124.

Resolver 124 may be any hardware or software component of system 120 capable of determining an object accessible to system 120 that corresponds to evidence data 150. Resolver 124 accepts, as input, evidence data 150. Resolver 124 then determines that an object 142 in data repository 122 corresponds to the evidence data 150. Resolver 124 then identifies object 142 to system 120 as being a match or substitute for the object referenced in item copy 130A.

System 120 then saves item copy 130A as item 140. In contrast to item 130, which included a reference name 134 referencing object 132, item 140 includes reference name 144 referencing object 142. In embodiments where item copy 130A included reference name 134, system 120 simply changes reference name 132 to reference name 142 when saving item copy 130A as item 140. In embodiments where item copy 130A includes evidence data 150 in lieu of reference name 134, system 120 substitutes reference name 144 for evidence data 150.

Architecture 100 is but one of many environments in which the techniques described herein may be utilized. For example, other environments may feature additional systems and/or data repositories. Still other environments may feature only one system operated by a first party who relies upon objects from a first set of data and a second party who instead relies on objects from a second set of data. Still other environments may feature a single data repository to which a sending party has different access rights than the receiving party.

3.0. Functional Description

Figure 2:
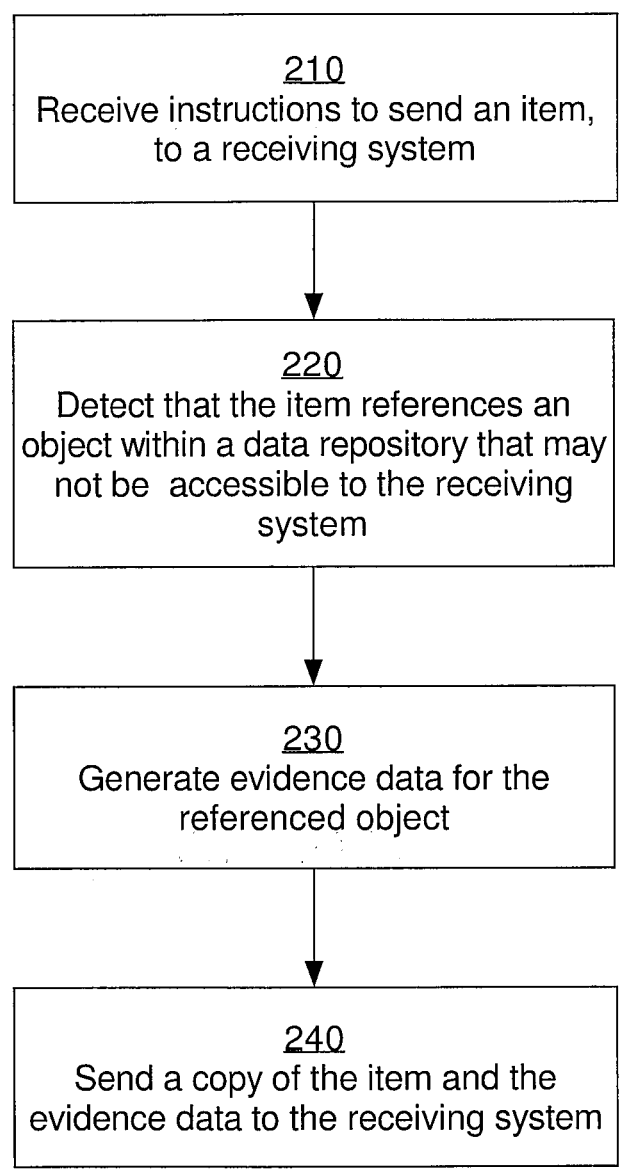
FIG. 2 is a flowchart illustrating a method for sending information from a sending system to a receiving system, wherein the information references non-shared data.

FIG. 2 is a flowchart illustrating a method for sending information from a sending system to a receiving system, wherein the information references non-shared data.

At step 210, a sending system, such as system 110, receives instructions to send an item, such as item 130, to a receiving system, such as system 120. For example, a user may be working with a financial analysis document at a financial analysis software client or other document viewing application executing within the sending system. Via the client, the user may instruct the financial analysis server to send the financial analysis document to a user at the receiving system.

At step 220, the sending system may detect that the item references one or more objects, such as object 132, within a data repository, such as data repository 112, that may not be shared with or otherwise accessible to the receiving system. For example, the financial analysis server may detect that the financial analysis document contains several graphs and tables that rely upon data associated with financial instrument objects named ALPH and BETA. These associations may be detected, for instance, because the financial analysis document may include metadata referencing the objects by their names. The metadata may be included, for instance, in instructions that cause a document viewing application to dynamically construct the document's graphs and tables from data stored in the sending system's data repository in association with the named objects. In some embodiments, the financial analysis server may assume that all objects referenced in the item are inaccessible to the receiving system, or that the receiving system does not have access to the same underlying data relied upon by the referenced objects. In other embodiments, the financial analysis server may further employ additional steps to determine whether or not particular referenced objects and/or data repositories are accessible to the receiving system.

At step 230, the sending system generates evidence data, such as evidence data 150, for each of the one or more referenced objects. For example, the financial analysis server may send data for the ALPH and BETA financial instrument objects to an evidence generation component. Using techniques such as those discussed in later sections of this application, the evidence generation component may produce and return evidence data for both ALPH and BETA.

At step 240, the sending system may send a copy of the item and the evidence data to the receiving system. The evidence data may be inserted into the item copy along with or in place of the names of one or more referenced objects. For example, the financial analysis server may send a copy of the financial analysis document to the receiving system, in which copy the financial analysis server has replaced the metadata that identifies the names ALPH and BETA with the generated evidence data. Evidence data may instead accompany the item as separate data. Or, evidence data may be sent at a different time than the item.

In some embodiments, evidence data may be pre-compiled for certain objects. In such embodiments, step 230 precedes the other steps of FIG. 2. In some embodiments, the sending system may already have sent to the receiving system mapping data indicating evidence data for various objects at the sending system. In these embodiments, step 220 may therefore be optional, while the sending of the evidence data aspect of step 240 may precede the other steps of FIG. 2.

Figure 3:
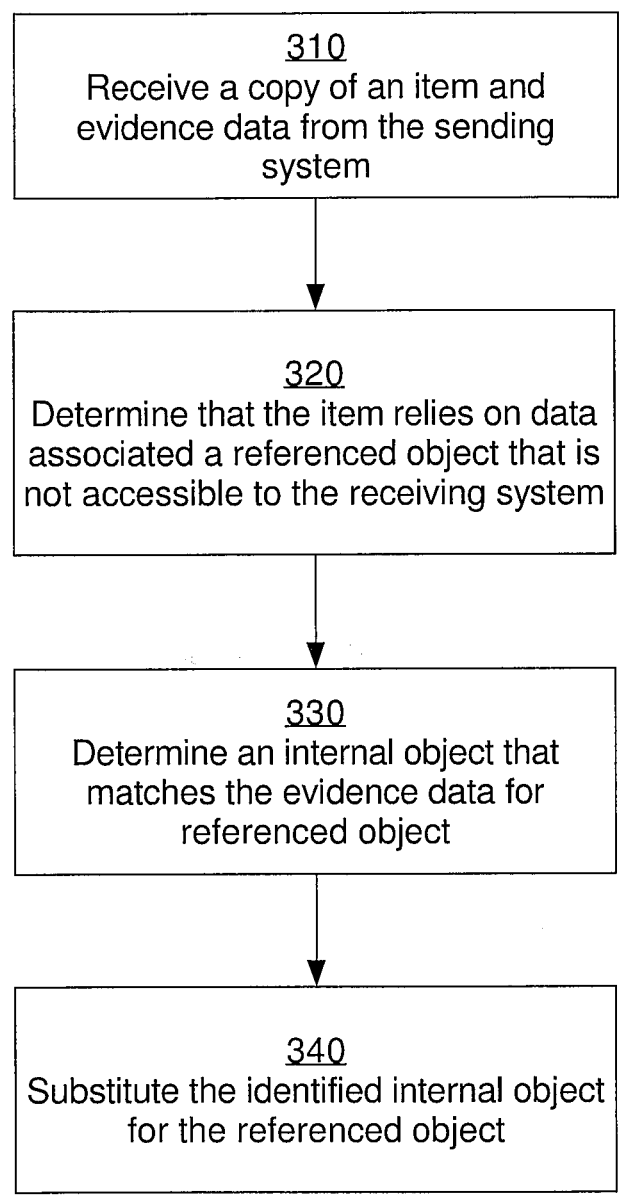
FIG. 3 is a flowchart illustrating a method for, at a receiving system, interpreting information received from a sending system, wherein the information references non-shared data from the sending system.

FIG. 3 is a flowchart illustrating a method for, at a receiving system, interpreting information received from a sending system, wherein the information references non-shared data from the sending system.

In step 310, the receiving system receives a copy of an item, such as item copy 130A, and evidence data from the sending system. The item copy and evidence data may be received together or separately. For example, a financial analysis server at the receiving system may receive the copy of a financial analysis document from the financial analysis server at the sending system.

In step 320, the receiving system determines that the received item copy relies on data associated with one or more referenced objects that may not be accessible to the receiving system. For example, the financial analysis server at the receiving system may detect that the copy of the financial analysis document contains data that, when interpreted by a document viewer, causes the document viewer to retrieve and graph data associated with objects were stored at the sending system—namely, the financial instrument objects ALPH and BETA. In some embodiments, the receiving system makes this determination implicitly, based on detecting that the financial analysis document contains or was received with evidence data. In some embodiments, all referenced objects are assumed to be inaccessible.

In step 330, for each of the one or more referenced objects relied upon by the item copy, the receiving system determines an internal object that matches the evidence data for the referenced object. Like object 140, the internal object is accessible to the receiving system via, for instance, a data repository connected to the receiving system, such as data repository 122. For example, the receiving system may have received a set of evidence data for each of two referenced financial instrument objects in the received item copy. The receiving system may send the sets of evidence data to a resolving component for financial instrument objects. The resolving component may in turn determine that two financial instrument objects stored within the receiving system's data repository—named ALPHALPHA and BETA—match the two sets of evidence data, respectively. A match may be determined using any algorithm capable of identifying an object that may be substituted for the object for which the evidence data was generated. Some example algorithms are discussed in subsequent sections.

In step 340, the receiving system may substitute each identified internal object for the corresponding referenced object from the sending system. The manner of substitution is not important, so long as the substitution results in receiving system relying on, for use with the received item, data associated with the internal objects instead of the referenced objects. For example, the financial analysis server at the receiving system may save the copy of the financial analysis document to the receiving system. In the saved copy of the financial analysis document, the financial analysis server may replace all metadata referencing the names ALPH and BETA (or evidence data that had been substituted for the names ALPH and BETA) with metadata referencing ALPHALPHA and BETA. The financial analysis document may subsequently be accessed by a user using a document viewing application at the receiving system. Because of the substitution, instead of failing or graphing incorrect data, the document viewing application will construct graphs and tables within the financial analysis document based on data associated with the ALPHALPHA and BETA objects in the receiving system's own data repository.

FIG. 2 and FIG. 3 have been discussed with respect to the particular example of a financial analysis document shared between two financial analysis servers. However, the item described in FIG. 2 and FIG. 3 may in fact be any item of information, and the sharing parties may be any server, software, or component of any computer-based system. Moreover, while the given examples have been with respect to objects that represent financial instruments, the objects described in FIG. 2 and FIG. 3 may be objects that represent any type of data or entity.

4.0. Implementation Examples 4.1. Evidence Data

Any type of data capable of communicating information that identifies a match or substitute for an object may be utilized as evidence data. Specific examples of evidence data are described below, however the scope of the evidence data is by no means limited to the described examples.

In an embodiment, objects may conform to pre-defined type definitions. For example, some pre-defined object types may include equities, bonds, derivatives, commodities, funds, persons, and entities. Accordingly, evidence data for an object may include data indicating the object type.

Evidence data may also include data indicating values associated with the object, such as the value of a specific field of data inside of the object, or values associated with specific object metadata. For example, an object of the type "equity" may include fields labeled ISIN, EXCH, TICKER, and COUNTRY. The evidence data generated for the object may include values for one or more of these fields. The values may be stored within the evidence data, for example, as a name value pair such as "ISIN=112233445566". Values may also be patterns (e.g. regular expressions) instead of actual values stored within the object. The included values may be of any data type, including textual, numerical, graphical, or audiovisual.

Evidence data may also include data describing the structure of the data associated with the object. For example, the evidence data may indicate a count of the fields, tables, columns, rows, and/or other elements associated with object. As another example, the evidence data may indicate the names, types, and/or sizes of some or all of the data elements associated with the object. As another example, evidence data may include data indicating specific dates or time ranges covered by the data associated with the object. As another example, evidence data may indicate a frequency or granularity of the data associated with the object.

Evidence data may be in any format capable of communicating the above information, including XML, plain text, code-based, and binary data formats. The evidence data may or may not include the evidenced object's name.

For example, the following XML data may represent evidence for an S&P 500 object. The evidence data includes the object model type, name, and symbol property value ('SPX').

```
<object class=" StockMarketIndex">
    <name>S&P 500 INDEX</name>
    <modelId>af11e33b-f54f-4a57-aec9-176e107c7232</modelId>
    <modelType> StockMarketIndex</modelType>
    <propertyTypes>
        <values>
            <PropertyType>
    <canonicalName>com.palantir.finance.SYMBOL</canonicalName>
            </PropertyType>
            <PropertyValue>
                    <value class="string">SPX</value>
                    <timeRange/>
            </PropertyValue>
        </values>
    </propertyTypes>
</object>
```

4.2. Generating Evidence Data

According to an embodiment, a system may generate evidence data based on evidence generation rules that dictate which of the above described elements should be included in the evidence data. Some or all of the rules may be hard-coded within one or more evidence generating components, such as resolver 114, of the system. For example, the system may comprise evidence generating components for each type of object the system encounters, or the system may have a universal evidence generating component. Some or all of the rules may instead be user-configurable via, for instance, an XML file, script, or user interface. For example, a system administrator may create evidence generation scripts for each object encountered by the system.

When a system or a component thereof generates evidence data for an object, the system may follow rules that cause the system to include within the evidence data criteria that uniquely identifies the object. For example, an object may be of a pre-defined object type. The system may have some knowledge of the nature of various fields of data associated with that data type. Based on this knowledge, the system may be able to determine that no two objects of the same type should have the same value or combination of values for one or more fields common to that object type. Accordingly, the system may generate evidence data that includes criteria indicating the values for those one or more fields.

For example, an object of the type "equity" may include an ISIN number. The system may recognize that no two equities should have the same ISIN number. Accordingly, the system may use the ISIN number and the object type as criteria in the evidence data. As another example, an equity may lack an ISIN number but include values for EXCH and TICKER fields. The system may be able to determine that no other equity should have the same values for those two fields. Thus, the values for those two fields may be used as criteria in the evidence data.

The system may also follow rules that cause the system to generate evidence data that includes substitutability criteria. The substitutability criteria indicate characteristics that a substitute for the evidenced object should or may possess. The system may create substitutability criteria instead of or in addition to data that uniquely identifies an object. For example, the system may include substitutability criteria in evidence data when the system is unable to generate data that uniquely identifies the object. As another example, the system may insert substitutability criteria in evidence data to provide another system with information about potential substitutes for an object, should the other system be unable to locate an exact match for the object. As another example, substitutability criteria may also be useful for verifying that a matching object actually contains the data that the sending system expects the matching object to contain.

As an example of substitutability criteria, the system may generate evidence data for an equity object that includes values for the TICKER and COUNTRY fields. Although the system cannot guarantee that TICKER and COUNTRY will uniquely identify an object, the system may nonetheless include these fields in the evidence data, since these fields may still effectively identify a match or at least a substitute for the evidenced object. As another example, the object for which the system is generating evidence may contain data indicating a price for each week of the year 2007. The system may generate evidence data for the object that includes criteria for a substitute object, such as a requirement that the substitute object should likewise have price data for each week of the year 2007.

The system may further generate evidence data that indicates which substitutability criteria are required of the substitute object as opposed to which characteristics are desirable of the substitute object. For example, an object may be required to have data for each week of the year 2007, while it may only be desirable that the object include data for each week of 2006.

When generating evidence data for an object referenced in a shared item, a system may also follow rules that consider how the shared item uses the data associated with the object. For example, when generating evidence data, a system may further narrow data indicating time ranges covered by the object to just those time ranges utilized by the shared item. Thus, even though the object contains data for an entire year, if the shared item only utilizes data for a particular month of that year, the criteria in the evidence data may indicate that a substitute for the object need only contain data for that particular month. As another example, if an object contains data indicating both opening and closing prices, but the shared item only utilizes closing prices, the criteria in the evidence data may indicate that a substitute for the object need only contain data for the closing prices.

The system may further or alternatively adhere to other rules having other objectives when generating evidence data.

4.3. Matching

As with the event-generation process, a system may also rely on resolution rules for determining objects that match or may substitute for an object evidenced by evidence data. This process of determining a match or substitute may be known as "resolving" the evidence data to an object. For example, a system may feature one or more resolver components, such as resolver 124, that resolve evidence data to objects based on a set of resolution rules. As with the evidence generation rules, some or all of the resolution rules may be hard-coded or user-configurable. According to an embodiment, both resolution and event generation are performed by the same system components. Thus, event generation rules and resolution rules may be intermingled or the same.

When a system attempts to resolve evidence data to an object, the system may follow rules that cause it to search for objects having associated data that matches unique identifying criteria stored within the evidence data. The system may instead or additionally follow rules that cause it to search for objects whose data matches substitutability criteria stored within the evidence data. In both cases, matching may be performed based on any suitable technique, including textual, phonetic, or pattern-based comparisons. In some embodiments, the search for matching objects is performed without any consideration of an object's name. In other embodiments, the object's name may also be considered.

Certain criteria specified in the evidence data may be considered "required" criteria, based on a designation in the evidence data or on a resolution rule. The system may eliminate any object that does not possess a required criterion as a match. Thus, objects that match uniquely identifying criteria may nonetheless be screened according to whether or not the objects also match required substitutability criteria. For example, if the system contains an object whose unique identifier matches that described in the evidence data, but whose data does not cover a required date range specified in the criteria, the system may determine that the object does not match the evidence data. Or, if the unique identifier is a strong match, such as is typically the case with ISIN values, the system would inform a user that a match was found, but data for the required date range does not exist.

According to an embodiment, multiple potential matches may be identified during the matching process. In such embodiments, the system may request that a user identify the object to which the evidence data should be resolved. The system may, for instance, prompt the user via a user interface to identify which object in a list of potential matching objects the system should rely upon for the shared item. The system may then use the identified object as the match for the evidence data.

According to an embodiment, the system follows rules that cause it to calculate a level of confidence that an object in the system matches the evidence data. The system may calculate a level of confidence for all objects in the system. Alternatively, the system may calculate a level of confidence for just those objects that match required criteria, such as those objects that are of the same object type as the evidenced object. The level of confidence, which may be based on any decimal or enumerated scale, indicates the degree to which an object matches the evidence data. For example, the rules may assign weights to each criterion in the evidence data, including both uniquely identifying and substitutability criteria, whether required or optional. Using the weights and the matched criteria, the system may compute a level of confidence. In some embodiments, the system may further rely upon an object's name in determining the level of confidence.

In some embodiments, the rules may require that an object have a level of confidence above some threshold value in order for that object to be considered a match or a potential match. In some embodiments, the system may also report the level of confidence to a user when requesting that the user select a match. In some embodiments, where multiple potential matches are found, the system may automatically select the potential match having the highest level of confidence, assuming that match is above a threshold level. If the potential match with the highest level of confidence is not above the threshold level, the system may prompt the user to identify a match.

In some cases, the system may be unable to determine a match. In such cases, the system is said to have failed to resolve the evidence data for the object. The system may take any of a number of reactions to such a failure, including deleting the shared document, removing any elements of the shared document that rely on the unresolved object, using dummy data for the unresolved object, automatically requesting the unresolved object from the system sharing the item, warning the user of the error and requesting further user guidance, and/or attempting to render the document without correcting the failure.

The system may further or alternatively adhere to other resolution rules and other matching techniques.

4.4. Miscellaneous

In an embodiment, when a user sends an item to another user who may not have access to a data repository upon which the item relies, the sending or receiving system may communicate a warning message to the user advising the user that the recipient may not be able to correctly view the data in the item. The receiving system may further warn the recipient that the receiving system will render the item using data from the recipient's own data repository instead of the sender's data repository, and thus the data may not be the same as was intended by the sender.

According to an embodiment, items within a system store references to objects within the system. The system automatically replaces the references with evidence when the item is sent outside of the system. According to another embodiment, the system also replaces references with evidence when an item is sent to a user of the system who lacks access permissions or connectivity to a relied upon data repository. According to another embodiment, the system automatically generates and stores evidence for all items, regardless of whether those items are intended to remain within the system.

In some embodiments, evidence data may be used to verify referenced objects even when the referenced object has a name that matches the name of an object found in the receiving system's repository. For example, if the sending system sends an item that references an object named BETA, the receiving system may utilize evidence data to verify that its object named BETA is the same or substantively similar to the object named BETA at the sending system.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
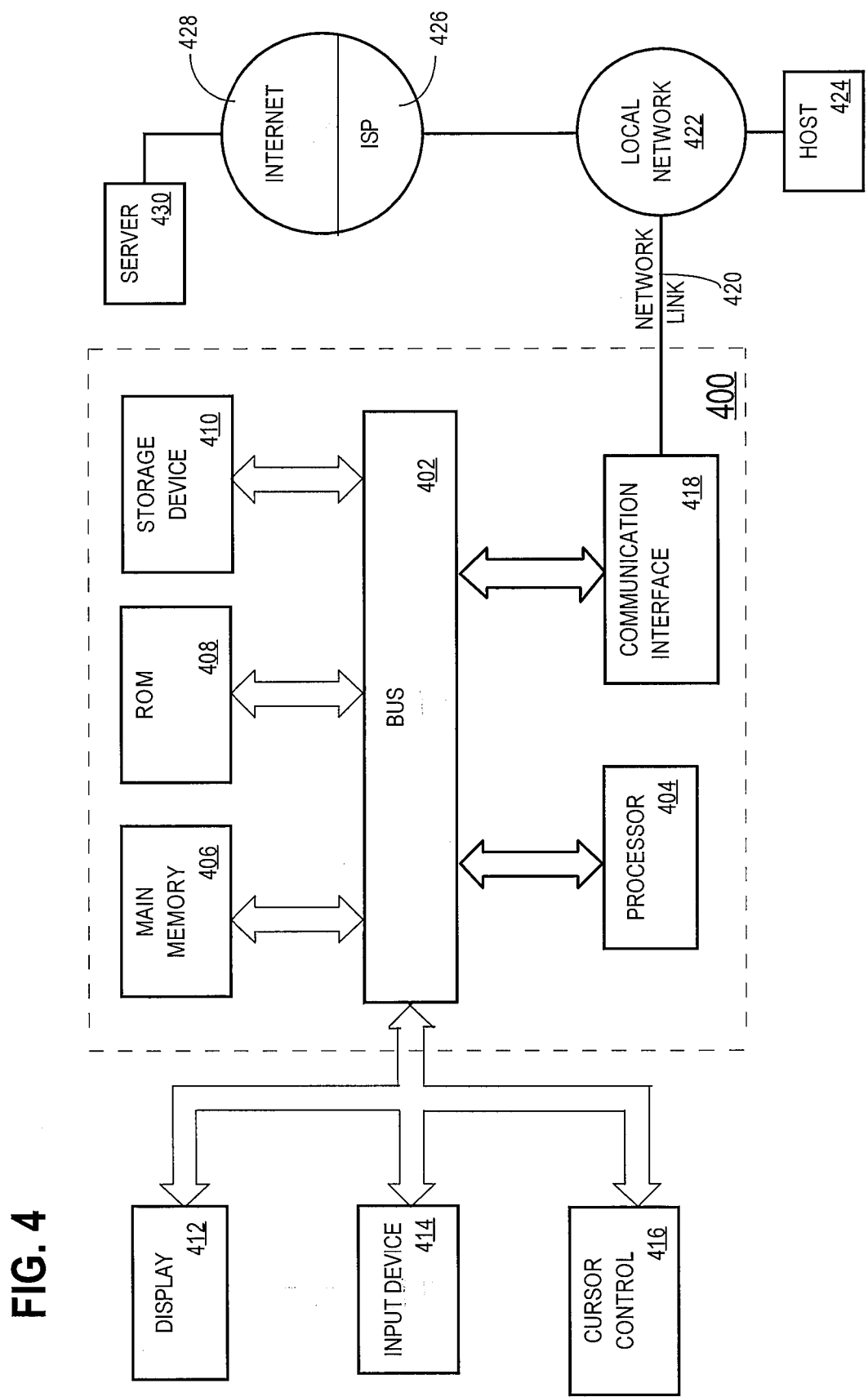
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine.

According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for sharing information, the method comprising:
   at a first server of a first data system, receiving a request to send a copy of a document to a second server of a second data system;
      wherein the first data system comprises at least the first server and a first repository that is accessible to the first server,
      wherein the document comprises a reference to a first object that is stored outside of the document and within the first repository, the document further comprising one or more instructions configured to cause generation of one or more presented components of the document based on retrieving data that belongs to the first object;
   at the first server, based at least partially upon the retrieved data belonging to the first object, generating evidence data that describes one or more aspects of the first object;
      wherein the evidence data is not identical to the reference or the retrieved data;
   responsive to the request to send the copy of the document to the second server, the first server at the first data system sending, to the second server at the second data system, the copy of the document and the evidence data;
   wherein the method is performed by one or more computing devices.

2. The method of claim 1, wherein the copy of the document includes the evidence data.

3. The method of claim 1, further comprising generating the copy of the document, wherein generating the copy of the document comprises replacing the reference with the evidence data.

4. The method of claim 1, further comprising, in response to receiving the request, the first server determining that the document comprises the reference, wherein generating the evidence data occurs in response to determining that the document comprises the reference.

5. The method of claim 1, wherein the evidence data uniquely identifies the first object.

6. The method of claim 1, wherein:
generating the evidence data comprises, based at least on the first object, determining one or more criteria for identifying another object that may substitute for the first object; and
the evidence data comprises the one or more criteria.

7. The method of claim 6, wherein determining one or more criteria for identifying another object that may substitute for the first object is further based upon a manner in which the document relies upon the retrieved data belonging to the first object.

8. The method of claim 1, wherein the evidence data includes data indicating at least one of the type of the first object or a plurality of structural characteristics of the retrieved data belonging to the first object.

9. The method of claim 1, wherein the first object represents a financial instrument, and wherein the evidence data is data describing characteristics of data stored for the financial instrument in the first repository accessible to the first data system.

10. The method of claim 1, wherein generating the evidence data occurs in response to determining that a copy of the first object is inaccessible to a recipient at the second data system.

11. A method for sharing information from a first data system with a second data system, the method comprising:
receiving, from a first server of the first data system, at a second server of the second data system (a) a document comprising one or more instructions configured to cause generation of one or more presented components of the document based on retrieving data belonging to a first object within a first repository of the first data system, and (b) evidence data describing one or more aspects of the first object;
wherein the first object has a first name;
wherein the evidence data is not identical to the first name;
wherein the retrieved data that belongs to the first object is not included in the document or the evidence data;
using the evidence data to identify a second object, stored within a second repository of the second data system, to be utilized as a substitute for the first object; and
generating and storing a copy of the document, wherein the copy of the document comprises a reference to the second object instead of the first object, and further comprises one or more instructions configured to cause generation of the one or more presented components based on retrieving data that belongs to the second object;
wherein the method is performed by one or more computing devices.

12. The method of claim 11, wherein:
the document references the first object using the first name;
generating the copy of the document comprises replacing references comprising the first name with references comprising a second name;
the second name is a name by which the second data system identifies the second object; and
the second name is different from the first name.

13. The method of claim 11, wherein:
the document references the first object using the evidence data;
generating the copy of the document comprises replacing the evidence data with a name by which the second data system identifies the second object.

14. The method of claim 11, wherein the evidence data uniquely identifies the second object.

15. The method of claim 11, wherein the evidence data identifies one or more mandatory criteria of an object that may substitute for the first object, wherein the second object satisfies the mandatory criteria.

16. The method of claim 11, wherein:
the evidence data identifies one or more criteria of an object that may substitute for the first object;
the second repository stores data for a plurality of objects that may substitute for the first object; and
the second object is an object in the plurality of objects that best satisfies the one or more criteria.

17. The method of claim 16, wherein identifying the second object comprises:
determining an object type for the first object; and
determining one or more resolution rules for the first object, wherein the one or more resolution rules identify weights for each of the one or more criteria;
based on the one or more criteria and the identified weights, determining which object in the plurality of objects best satisfies the one or more criteria.

18. The method of claim 11, wherein the evidence data includes data indicating at least one of the type of the first object or a plurality of structural characteristics of data associated with the first object.

19. The method of claim 11, wherein the first object and the second object both represent financial instruments, wherein the evidence data is data describing characteristics of data stored for the financial instrument at the first repository.

20. The method of claim 11, wherein identifying the second object comprises:
determining a plurality of objects that may substitute for the first object;
in response to a user accessing the document, prompting the user to identify which of the plurality of objects should be substituted for the first object.

21. One or more non-transitory computer-readable media storing instructions for sharing information, which instructions, when executed by one or more processors, cause performance of steps including:
at a first server of a first data system, receiving a request to send a copy of a document to a second server of a second data system;
wherein the first data system comprises at least the first server and a first repository that is accessible to the first server,
wherein the document comprises a reference to a first object that is stored outside of the document and within the first repository, the document further comprising one or more instructions configured to cause generation of one or more presented components of the document based on retrieving data that belongs to the first object;
at the first server, based at least partially upon the retrieved data belonging to the first object, generating evidence data that describes one or more aspects of the first object;
wherein the evidence data is not identical to the reference or the retrieved data;
responsive to the request to send the copy of the document to the second server, the first server at the first data system sending, to the second server at the second data system, the copy of the document and the evidence data.

22. The one or more non-transitory computer-readable media of claim 21, wherein the copy of the document includes the evidence data.

23. The one or more non-transitory computer-readable media of claim 21, wherein the steps further include: generating the copy of the document, wherein generating the copy of the document comprises replacing the reference with the evidence data.

24. The one or more non-transitory computer-readable media of claim 21, wherein the steps further include: in response to receiving the request, the first server determining that the document comprises the reference, wherein generating the evidence data occurs in response to determining that the document comprises the reference.

25. The one or more non-transitory computer-readable media of claim 21, wherein the evidence data uniquely identifies the first object.

26. The one or more non-transitory computer-readable media of claim 21, wherein:
   generating the evidence data comprises, based at least on the first object, determining one or more criteria for identifying another object that may substitute for the first object; and
   the evidence data comprises the one or more criteria.

27. The one or more non-transitory computer-readable media of claim 26, wherein determining one or more criteria for identifying another object that may substitute for the first object is further based upon a manner in which the document relies upon the retrieved data belonging to the first object.

28. The one or more non-transitory computer-readable media of claim 21, wherein the evidence data includes data indicating at least one of the type of the first object or a plurality of structural characteristics of the retrieved data belonging to the first object.

29. The one or more non-transitory computer-readable media of claim 21, wherein the first object represents a financial instrument, and wherein the evidence data is data describing characteristics of data stored for the financial instrument in the first repository accessible to the first data system.

30. The one or more non-transitory computer-readable media of claim 21, wherein generating the evidence data occurs in response to determining that a copy of the first object is inaccessible to a recipient at the second data system.

31. One or more non-transitory computer-readable media storing instructions for sharing information from a first data system with a second data system, which instructions, when executed by one or more processors, cause performance of steps comprising:
   receiving, from a first server of the first data system, at a second server of the second data system (a) a document comprising one or more instructions configured to cause generation of one or more presented components of the document based on retrieving data belonging to a first object within a first repository of the first data system, and (b) evidence data describing one or more aspects of the first object;
   wherein the first object has a first name;
   wherein the evidence data is not identical to the first name;
   wherein the retrieved data that belongs to the first object is not included in the document or the evidence data;
   using the evidence data to identify a second object, stored within a second repository of the second data system, to be utilized as a substitute for the first object; and
   generating and storing a copy of the document, wherein the copy of the document comprises a reference to the second object instead of the first object, and further comprises one or more instructions configured to cause generation of the one or more presented components based on retrieving data that belongs to the second object.

32. The one or more non-transitory computer-readable media of claim 31, wherein:
   the document references the first object using the first name;
   generating the copy of the document comprises replacing references comprising the first name with references comprising a second name;
   the second name is a name by which the second data system identifies the second object; and
   the second name is different from the first name.

33. The one or more non-transitory computer-readable media of claim 31, wherein:
   the document references the first object using the evidence data;
   generating the copy of the document comprises replacing the evidence data with a name by which the second data system identifies the second object.

34. The one or more non-transitory computer-readable media of claim 31, wherein the evidence data uniquely identifies the second object.

35. The one or more non-transitory computer-readable media of claim 31, wherein the evidence data identifies one or more mandatory criteria of an object that may substitute for the first object, wherein the second object satisfies the mandatory criteria.

36. The one or more non-transitory computer-readable media of claim 31, wherein:
   the evidence data identifies one or more criteria of an object that may substitute for the first object;
   the second repository stores data for a plurality of objects that may substitute for the first object; and
   the second object is an object in the plurality of objects that best satisfies the one or more criteria.

37. The one or more non-transitory computer-readable media of claim 36, wherein identifying the second object comprises:
   determining an object type for the first object; and
   determining one or more resolution rules for the first object, wherein the one or more resolution rules identify weights for each of the one or more criteria;
   based on the one or more criteria and the identified weights, determining which object in the plurality of objects best satisfies the one or more criteria.

38. The one or more non-transitory computer-readable media of claim 31, wherein the evidence data includes data indicating at least one of the type of the first object or a plurality of structural characteristics of data associated with the first object.

39. The one or more non-transitory computer-readable media of claim 31, wherein the first object and the second object both represent financial instruments, wherein the evidence data is data describing characteristics of data stored for the financial instrument at the first repository.

40. The one or more non-transitory computer-readable media of claim 31, wherein identifying the second object comprises:
   determining a plurality of objects that may substitute for the first object;
   in response to a user accessing the document, prompting the user to identify which of the plurality of objects should be substituted for the first object.

41. The method of claim 1, wherein the one or more components include a depiction of at least the retrieved data in the form of one or more of: a graph, chart, table, and/or spreadsheet.

42. The method of claim 1:
wherein the document is viewable in a viewing application;
wherein the one or more instructions are configured to cause the viewing application to, upon opening the document, retrieve the data belonging to the first object and dynamically generate a view of the retrieved data.

43. The method of claim 1, wherein the retrieved data comprises data stored in association with the reference to the first object in a plurality of at least one of: fields, tables, columns, or rows.

44. The method of claim 11, wherein the one or more components include a depiction of at least the retrieved data in the form of one or more of: a graph, chart, table, and/or spreadsheet.

45. The method of claim 11:
wherein the document is viewable in a viewing application;
wherein the one or more instructions in the document are configured to cause the viewing application to retrieve the data belonging to the first object and dynamically generate a view of the retrieved data.

46. The method of claim 11, wherein the retrieved data comprises data stored in association with the reference to the first object in a plurality of at least one of: fields, tables, columns, or rows.

47. The one or more non-transitory computer-readable media of claim 21, wherein the one or more components include a depiction of at least the retrieved data in the form of one or more of: a graph, chart, table, and/or spreadsheet.

48. The one or more non-transitory computer-readable media of claim 21:
wherein the document is viewable in a viewing application;
wherein the one or more instructions are configured to cause the viewing application to, upon opening the document, retrieve the data belonging to the first object and dynamically generate a view of the retrieved data.

49. The one or more non-transitory computer-readable media of claim 21, wherein the retrieved data comprises data stored in association with the reference to the first object in a plurality of at least one of: fields, tables, columns, or rows.

50. The one or more non-transitory computer-readable media of claim 31, wherein the one or more components include a depiction of at least the retrieved data in the form of one or more of: a graph, chart, table, and/or spreadsheet.

51. The one or more non-transitory computer-readable media of claim 31:
wherein the document is viewable in a viewing application;
wherein the one or more instructions in the document are configured to cause the viewing application to retrieve the data belonging to the first object and dynamically generate a view of the retrieved data.

52. The one or more non-transitory computer-readable media of claim 31, wherein the retrieved data comprises data stored in association with the reference to the first object in a plurality of at least one of: fields, tables, columns, or rows.

* * * * *